United States Patent [19]

Crane et al.

[11] Patent Number: 5,008,813
[45] Date of Patent: Apr. 16, 1991

[54] MULTI-CACHE DATA STORAGE SYSTEM

[75] Inventors: David P. Crane; Terence M. Cole, both of Reading; Geoffrey Poskitt, Camberley, all of England

[73] Assignee: International Computers Limited, London, England

[21] Appl. No.: 261,033

[22] Filed: Oct. 21, 1988

[30] Foreign Application Priority Data

Dec. 5, 1987 [GB] United Kingdom ............... 8728494

[51] Int. Cl.$^5$ .......................................... G06F 13/00
[52] U.S. Cl. ................................................ 364/200
[58] Field of Search ............................. 364/200, 900

[56] References Cited

U.S. PATENT DOCUMENTS

| | | | |
|---|---|---|---|
| 3,693,165 | 9/1972 | Reiley et al. | 364/200 |
| 3,699,533 | 10/1972 | Hunter | 364/200 |
| 3,848,234 | 11/1974 | MacDonald | 364/200 |
| 4,426,681 | 1/1984 | Bacot et al. | 364/200 |
| 4,445,191 | 4/1984 | York | 364/900 |
| 4,453,230 | 6/1984 | Mizoguchi et al. | 364/900 |
| 4,481,573 | 11/1984 | Fukunaga et al. | 364/200 |
| 4,602,368 | 7/1986 | Cirello et al. | 364/900 |
| 4,785,395 | 11/1988 | Keeley | 364/200 |
| 4,843,542 | 6/1989 | Dashiell et al. | 364/200 |
| 4,858,111 | 8/1989 | Steps | 364/200 |
| 4,977,498 | 12/1990 | Rastegar et al. | 364/200 |

FOREIGN PATENT DOCUMENTS 0232526  8/1987  European Pat. Off. .

OTHER PUBLICATIONS

European Search Report-EP 88 30 9704, 6/6/1990.
Alan Jay Smith, "Cache Memories", Computing Surveys, vol. 14, No. 3, Sep. 1982, pp. 475-530.

Primary Examiner—Michael R. Fleming
Assistant Examiner—Ayaz R. Sheikh
Attorney, Agent, or Firm—Lee, Mann, Smith, McWilliams & Sweeney

[57] ABSTRACT

A multi-cache data storage system has a number of cache units and a main memory. The caches are addressed by a virtual address. When data is updated in one of the caches, the virtual address is translated into a physical address and sent to the main memory over a bus, along with the updated data value. Each cache continuously monitors the bus for updates from other caches and checks whether it holds a data item corresponding to the physical address. If so, the data item is updated or invalidated, so as to ensure cache coherency.

2 Claims, 2 Drawing Sheets

MULTI-CACHE DATA STORAGE SYSTEM

This invention relates to multi-cache data storage systems. More specifically, the invention is concerned with a data storage system of the kind comprising a main store and a plurality of smaller, faster cache stores. The invention is particularly although not exclusively concerned with a storage system of this kind for use in a multi-processor data processing system, in which each of the cache stores is associated with a respective one of the processors, and the main store is shared among the processors.

In such a system, when one of the cache stores is updated, it is in general also necessary to update the corresponding data in the main store. If the same data is also held in any of the other cache stores, it will now be inconsistent with the data in the main store. This is referred to as the problem of cache coherency.

One way of overcoming this problem is to arrange for each cache to continuously monitor all updates to the main store from any other cache. If any of these updates relate to a data item in the cache, it is updated or invalidated.

In a data storage system using virtual addressing, there are two possibilities for addressing the cache store: either with the virtual address or with the corresponding physical (real) address. Using the virtual address has the advantage that it does not need to be translated into the physical address before the cache can be accessed, and hence cache access is faster.

In order to ensure cache coherency in a multi-cache system with virtually addressed caches, it has been proposed that, when a cache updates a data item, it broadcasts the virtual address of that data item to all the other caches, as well as sending the physical address to the main store. Each cache can therefore monitor the virtual addresses from the other caches and use them to invalidate the corresponding data items so as to ensure cache coherency. However, this solution increases the number of connections required between the caches.

The object of the present invention is to avoid this need to send both the virtual address and the physical address.

SUMMARY OF THE INVENTION

According to the invention, there is provided a multi-cache data storage system comprising a plurality of cache units connected by a bus to a main memory, wherein each cache unit comprises:
(a) a data cache, addressed by a virtual address,
(b) means for translating the virtual address into a physical address, and for transmitting the physical address over the bus to the main memory, and
(c) means responsive to a physical address received over the bus, for determining whether a data item corresponding to that physical address is present in the data cache, and, if so, updating or invalidating that data item in the data cache.

BRIEF DESCRIPTION OF THE DRAWINGS

One multi-processor system including a multi-cache memory system in accordance with the invention will now be described by way of example with reference to the accompanying drawings.

DESCRIPTION OF AN EMBODIMENT OF THE INVENTION

Figure 1:
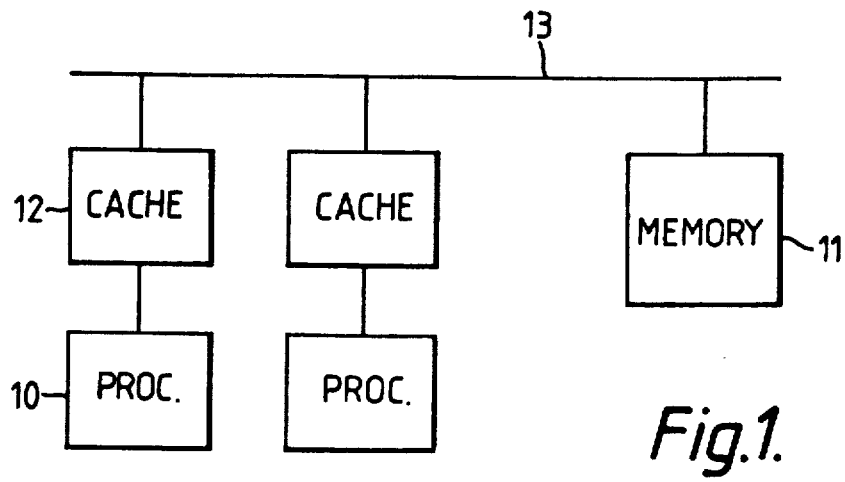
FIG. 1 is an overall block diagram of the multi-processor system, including a plurality of cache store units.

Referring to FIG. 1, the multi-processor system comprises a plurality of processing units 10, and a shared main memory 11. Each processing unit 10 has its own cache unit 12. The cache units 12 are all connected to the main memory 11 by way of a high speed private memory bus 13.

In operation, when a processing unit 10 requires to read or write a data item, it sends the virtual address VA of that item to its cache unit 12. If the required data item is present in the cache, it can be accessed immediately by the processing unit, for reading or writing. Whenever one of the processors 10 updates a data item in its cache unit 12, the cache generates an update message over the bus to the main memory 11. This ensures that the main memory is kept consistent with the cache.

Each cache unit continuously monitors the bus 13 for any update messages from the the other cache units. Whenever a cache detects such a message, it checks whether the updated data item is present in the cache and, if so, invalidates it. This ensures cache coherency. The way in which this is done will be described below.

Figure 2:
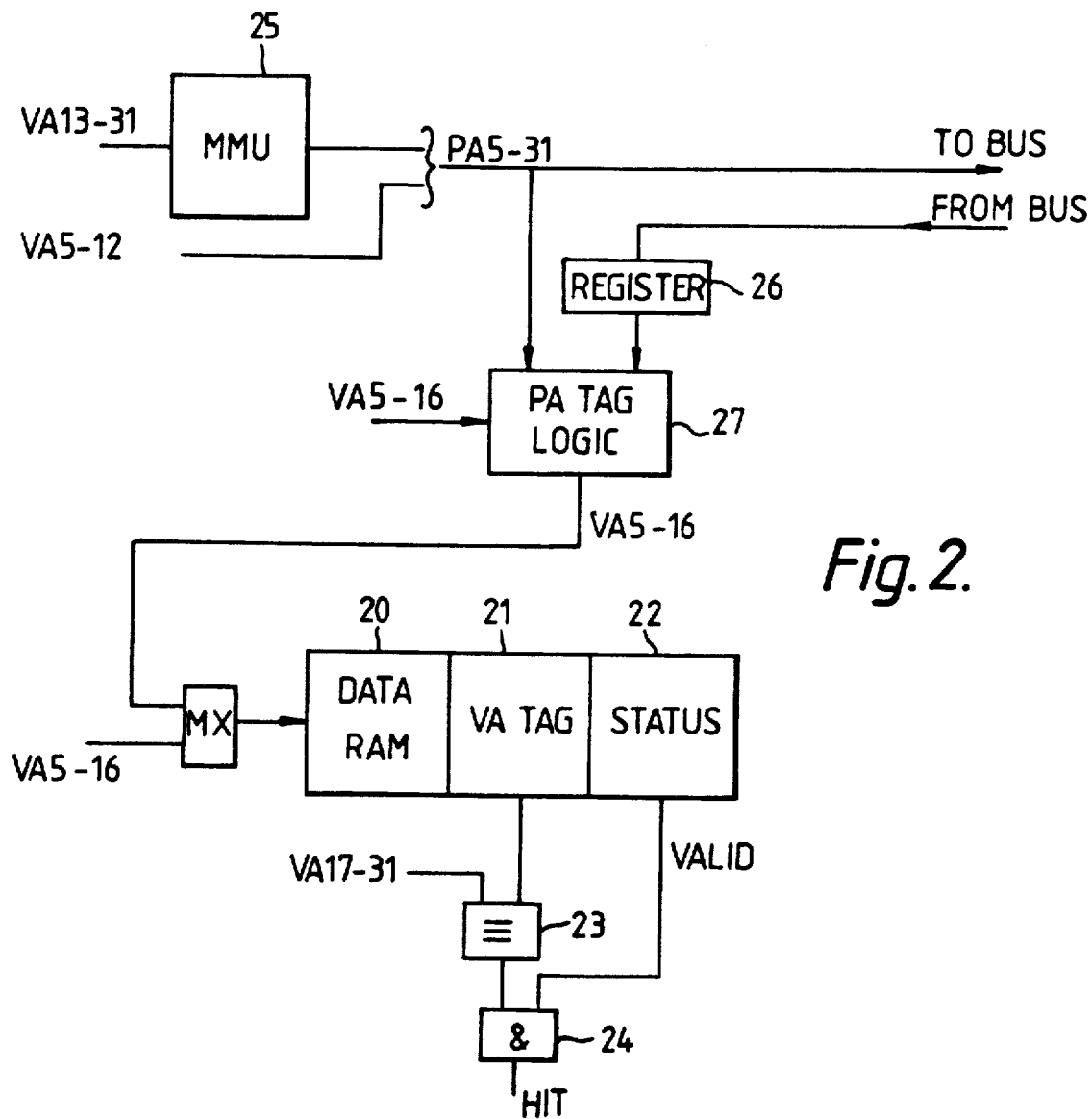
FIG. 2 shows one cache store unit in more detail.

Referring now to FIG. 2, this shows one of the cache units 12 in detail.

The cache comprises a data random-access memory (RAM) 20, holding 128K bytes. The RAM is organised as 4K individually addressable lines, each line holding 32 bytes. The data RAM is addressed by bits VA 5–16 of a 32-bit virtual address VA 0–31, so as to access one line of data for reading or writing. Bits VA 0–4 specify one byte within the address line, but are not used within the cache.

The cache also includes a VA tag RAM 21, which holds 4K tags, one for each line of data in the data RAM. Each tag represents bits VA 17–31 of the virtual address of the data held in this line. The VA tag RAM is addressed by bits VA 5–16.

The cache further includes a status tag RAM 22, which holds 4K status tags, one for each line of the data RAM. Each of these tags includes a validity bit indicating whether or not the corresponding line of data is valid. The status tag RAM is also addressed by bits VA 5–16.

Whenever the processing unit 10 requires to access a data item, it sends the virtual address VA 5–31 to the cache. Bits VA 5–16 access one line of the cache, and its corresponding VA tag and status tag. The VA tag from the RAM 21 is then compared with bits VA 17–31 of the virtual address from the processor, by means of a comparator 23. The result is then combined in an AND gate 24 with the validity bit for the RAM 22, so as to produce a HIT signal.

Thus, HIT is true only if the VA tag of the addressed line of data matches the corresponding bits of the virtual address, and that line is valid. The HIT signal therefore indicates to the processing unit that the required data is present in the cache, and can be read or updated as required.

The cache unit also includes a memory management unit (MMU) 25, which translates the virtual address bits VA 5–31 into a physical address PA 5–31. The address space is divided into pages of 8K bytes. Bits VA 13–31 constitute a virtual page address, and are translated by the MMU into a corresponding physical page address PA 13-31. Bits VA 5-12 specify a line of 32 bytes within the page, and are used directly as the corresponding bits PA 5-12 of the physical address, without any translation.

Whenever the processor updates a line of data in the cache, the cache sends an update message over the bus 13 to the main memory. This update message includes the physical address bits PA 5-31, and also the updated value of the data line.

The cache unit continuously monitors the bus 13 for update messages from other cache units. Whenever it detects such a message, it captures the physical address bits PA 5-31 of the message in a register 26.

The PA from the register 26 is applied to a PAtag logic circuit 27. As will be described in detail below, the PA tag logic holds as tags the physical addresses of all the lines of data currently in the cache. The PA tag logic effectively performs a parallel search on all the PA tags held in it, and this determines whether or not the corresponding line of data is held in the cache. If a match is detected, the PA tag logic outputs the virtual address bits VA 5-12, indicating the position of the data line in the data RAM 20. These VA bits are then used to address the status tag RAM 22, and the validity bit of the addressed status tag is cleared. This invalidates the corresponding data line and hence ensures cache coherency.

It can be seen that the PA tag logic 27 must effectively perform a comparison between the PA from the bus and the PA tags of all 4K lines in the cache. At first sight, this requires a large associative memory, capable of performing 4K comparisons in parallel. However, as will be shown, the present embodiment avoids the need for such a large number of simultaneous comparisons.

Figure 3:
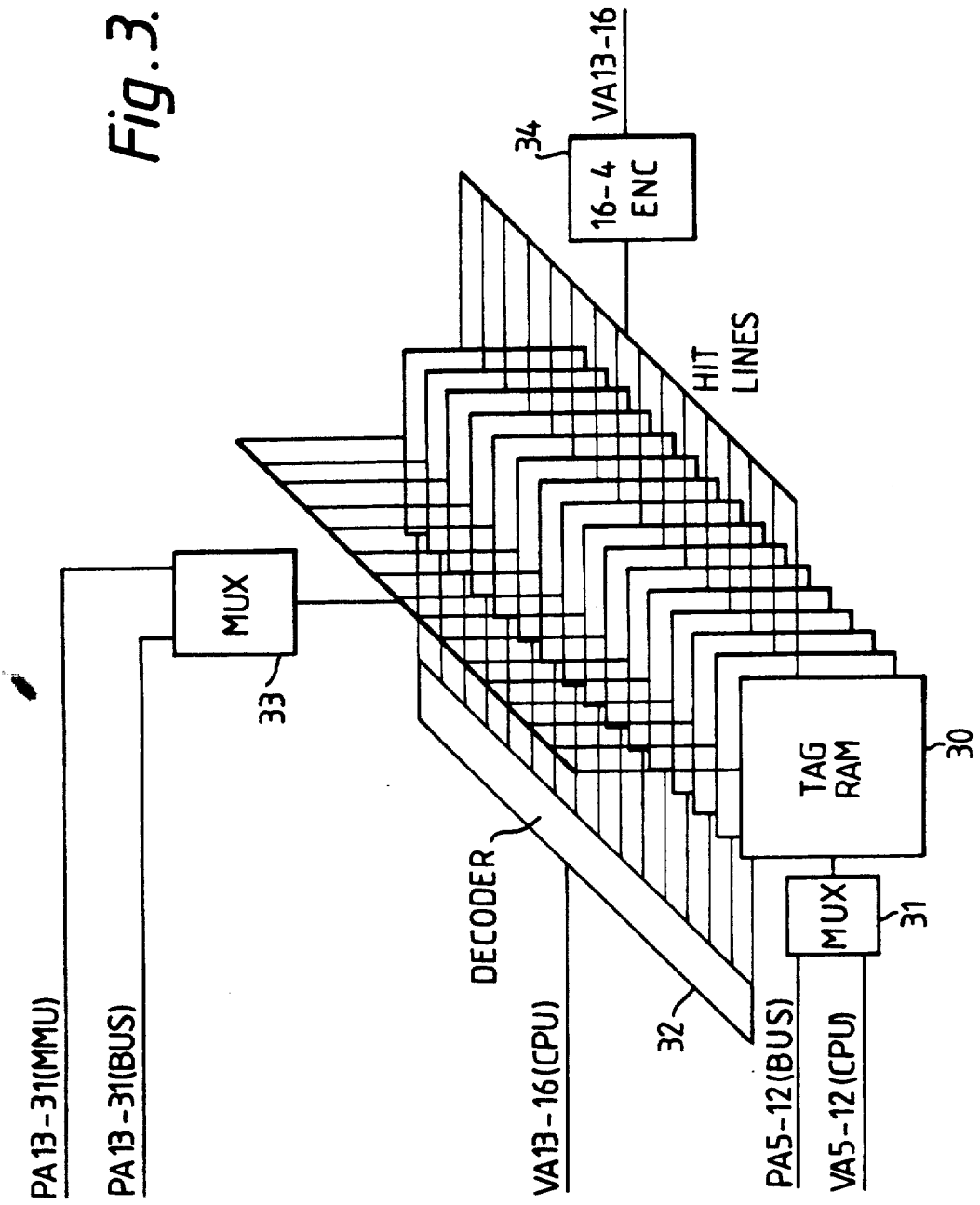
FIG. 3 shows a physical address tag unit forming part of the cache store unit.

Referring now to FIG. 3 this shows the PA tag logic in detail.

This logic comprises sixteen PA tag RAMs 30, each of which holds 256 tags. There are thus 256×16=4K tags altogether, one for each of the data lines in the data RAM.

All the RAMs 30 are addressed in parallel by the outputs of a multiplexer 31, which selects either bits PA 5-12 from the bus (by way of register 26), or bits VA 5-12 from the processing unit.

Any one of the RAMs 3Q can be selected by means of bits VA 13-16 from the processing unit. These bits are decoded by a decoder 32 to produce a write enable signal for the selected one of the RAMs.

All the tag RAMs 30 receive a common input signal from a multiplexer 33, which selects either bits PA 13-31 from the MMU 25, or bits PA 13-31 from the bus.

Whenever a new line of data is loaded into the cache, the PA tag RAMs are addressed by VA 5-12 and VA 13-16, so as to select one tag in one of the RAMs. The physical address bits PA 13-31 from the MMU are then written into the selected tag, as a PA tag for the new line of data. In this way, the PA tag logic keeps tags indicating the physical addresses of all the data lines in the cache.

Whenever an update message is detected in the bus, the tag RAMs 30 are all addressed by PA 5-12 from the bus. The bits PA 13-31 from the bus are then compared, in parallel, with the addressed tag in each of the tag RAMs, i.e. sixteen comparisons are performed in parallel, one by each of the tag RAMs. Each of the tag RAMs has a HIT output line, which indicates a match between the input PA 13-31 and the stored tag.

For reasons to be explained below, only one (or none) of the HIT outputs will be true at any given time. The HIT outputs are applied to a 16:4 encoder 34, which encodes the position of the true HIT signal. The output of the encoder 34 thus reconstructs bits VA 13-16 of the virtual address of the data line with physical address equal to bits PA 5-21 from the bus. The reconstructed VA 13-16 from the encoder are combined with bits PA 5-12 from the bus, to provide the required virtual address VA 5-16 for invalidating the status tag RAM, as described above.

If, on the other hand, none of the HIT signals from the tag RAMS 30 are true, then the encoder 34 produces a MISS signal, indicating that the data line in question is not present in the cache.

Thus, it can be seen that the PA tag logic shown in FIG. 3 can check whether a data line with a particular PA tag is present in the cache, by performing only sixteen comparisons in parallel, rather than having to perform 4K comparisons. This is achieved by making use of the fact that, of the bits VA 5-16 which are used to address the cache RAMs, bits VA 5-12 are identical with bits PA 5-12 of the physical address; only bits VA 13-16 are different from the physical address. Hence, when a physical address is received from the bus, there are only 16 possible lines in the cache which might hold data with this PA.

The PA tag RAMs 30 may be implemented, for example, by means of four Fujitsu MB 81 C50 CMOS TAG Random Access Memories. Each of these devices provides a four-way tag RAM, including comparators for performing the tag comparisons, and can therefore be used to implement a group of four of the tags RAMs 30.

In a virtual address memory system, several different virtual addresses may map on to the same physical address, these being referred to as synonyms. In general, this means that there may be more than one line in the cache corresponding to a particular physical address. In the present system, this is avoided by a software restriction, which requires that synonyms must be aligned on some multiple of 128K byte boundaries (i.e the size of the cache). This means that synonyms will all map on to he same line of the cache, and hence, at any given time, only one of them can be present in the cache. This is the reason why only one of the tag RAMs 30 can produce a HIT at any given time.

In the above description, it was assumed that a "write through" strategy is adopted for updates, i.e. that the main store is updated whenever the cache is updated. However, it will be appreciated that the invention is equally applicable to storage systems using a "copy back" strategy, i.e. in which data is updated in the main store only when it is about to be overwritten in the cache and has been modified since it was loaded into the cache.

Also in the above description, when a hit is detected by the PA tag logic, the corresponding data item is invalidated in the cache. Alternatively, the data item may be updated with the new value from the bus, which will also ensure cache coherency.

It should be noted that the virtual address VA 0-31 may be extended in known manner by a context number to create a full virtual address.

We claim:

1. A cache unit comprising:
   (A) means for receiving a virtual address comprising first, second and third portions, (B) means for receiving an input physical address comprising first and second portions, p1 (C) a data cache RAM for holding a plurality of data items,
(D) first multiplexing means for selecting one of the following to address the data cache RAM:
  (i) the first and second portions of the virtual address,
  (ii) the first portion of the input physical address and a reconstructed second portion of the virtual address,
(E) a memory management unit for translating the virtual address to form an output physical address comprising first and second portions, the first portion of the output physical address being equal to the first portion of the virtual address, and the second portion of the output physical address being derived from the second and third portions of the virtual address,
(F) a plurality of tag RAMS, each of which holds a plurality of physical address tags, each tag RAM having address, data and write enable inputs, and having a HIT output which indicates a match between data applied to the data input and a currently addressed tag in that tag RAM,
(G) second multiplexing means for selecting one of the following to be applied in parallel to the address inputs of all the tag RAMs:
  (i) the first portion of the virtual address,
  (ii) the first portion of the physical address,
(H) third multiplexing means for selecting one of the following to be applied in parallel to the data inputs of all the tag RAMs:
  (i) the second portion of the output physical address,
  (ii) the second portion of the input physical address,
(I) a decoder having an input connected to receive the second portion of the virtual address and having a plurality of outputs connected to the write enable inputs of the respective tag RAMs, and
(J) an encoder having a plurality of inputs connected to receive the HIT outputs of the respective tag RAMs, and having an output which supplies said reconstructed second portion of the virtual address.

2. A data processing system comprising a plurality of processing units, a plurality of cache units connected to corresponding ones of the processing units, a main memory, and a bus connecting all the cache units in parallel to the main memory, wherein each cache unit comprises:

(A) means for receiving from the corresponding processing unit a virtual address comprising first, second and third portions,
(B) means for receiving from the bus an input physical address comprising first and second portions,
(C) a data cache RAM for holding a plurality of data items,
(D) first multiplexing means for selecting one of the following to address the data cache RAM:
  (i) The first and second portions of the virtual address,
  (ii) the first portion of the input physical address and a reconstructed second portion of the virtual address,
(E) a memory management unit for translating the virtual address to form an output physical address comprising first and second portions, the first portion of the output physical address being equal to the first portion of the virtual address, and the second portion of the output physical address being derived from the second and third portions of the virtual address, the output physical address being applied to said bus,
(F) a plurality of tag RAMs, each of which holds a plurality of physical address tags, each tag RAM having address, data and write enable inputs, and having a HIT output which indicates a match between data applied to the data input and a currently addressed tag in that tag RAM,
(G) second multiplexing means for selecting one of the following to be applied in parallel to the address inputs of all the tag RAMs:
  (i) the first portion of the virtual address,
  (ii) the first portion of the input physical address,
(H) third multiplexing means for selecting one of the following to be applied in parallel to the data inputs of all the tag RAMs:
  (i) the second portion of the output physical address,
  (ii) the second portion of the input physical address,
(I) a decoder having an input connected to receive the second portion of the virtual address and having a plurality of outputs connected to the write enable inputs of the respective tag RAMs, and
(J) an encoder having a plurality of inputs connected to receive the HIT outputs of the respective tag RAMs, and having an output which supplies said reconstructed second portion of the virtual address.

* * * * *